US009852757B2

(12) United States Patent
Cai et al.

(10) Patent No.: US 9,852,757 B2
(45) Date of Patent: Dec. 26, 2017

(54) SYSTEMS AND METHODS FOR DECODING USING RUN-LENGTH LIMITED (RLL) CODES

(71) Applicant: Marvell International Ltd., Hamilton (BM)

(72) Inventors: Kui Cai, Singapore (SG); Anmin Kong, Singapore (SG); Zhimin Yuan, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/248,620

(22) Filed: Aug. 26, 2016

(65) Prior Publication Data

US 2016/0365112 A1    Dec. 15, 2016

Related U.S. Application Data

(62) Division of application No. 14/694,401, filed on Apr. 23, 2015, now Pat. No. 9,431,053.

(30) Foreign Application Priority Data

Apr. 24, 2014 (SG) .......................... 10201401781X

(51) Int. Cl.
G11B 5/09 (2006.01)
G11B 20/14 (2006.01)
G11B 20/12 (2006.01)
G11B 20/10 (2006.01)

(52) U.S. Cl.
CPC ...... *G11B 20/1426* (2013.01); *G11B 20/1217* (2013.01); *G11B 20/1403* (2013.01); *G11B 5/09* (2013.01); *G11B 20/10009* (2013.01)

(58) Field of Classification Search
None
See application file for complete search history.

(56) References Cited

U.S. PATENT DOCUMENTS

| 5,859,601 A   | 1/1999  | Moon et al.     |              |
|---------------|---------|-----------------|--------------|
| 6,201,485 B1* | 3/2001  | McEwen          | H03M 7/00    |
|               |         |                 | 341/59       |
| 6,476,737 B1  | 11/2002 | Caroselli et al.|              |
| 6,604,221 B1* | 8/2003  | Ueno            | G11B 5/012   |
|               |         |                 | 714/746      |

(Continued)

OTHER PUBLICATIONS

Immink, Kees A. Schouhamer. "High-Rate Maximum Runlength Constrained Coding Schemes Using Nibble Replacement." IEEE Transactions on Information Theory vol. 58, No. 10, Oct. 2012: 9 pages.

*Primary Examiner* — Tan X Dinh

(57) ABSTRACT

A method of decoding a codeword that satisfies a k constraint into output data includes, using a decoder of a hard disk drive system, converting each bit of the codeword in Non-Return-to-Zero format, extracting, from the converted codeword, a plurality of data blocks comprising a first data block and a plurality of remaining data blocks, performing a first analysis on the plurality of data blocks for modifying each of the plurality of data blocks that satisfies a first predetermined criterion, and performing a second analysis on the plurality of data blocks after the first analysis for modifying each of the plurality of data blocks that satisfies a second predetermined criterion to obtain the output data.

20 Claims, 14 Drawing Sheets

(56) References Cited

U.S. PATENT DOCUMENTS

| | | | |
|---|---|---|---|
| 6,985,320 B2 | 1/2006 | Blaum et al. | |
| 7,002,492 B2 * | 2/2006 | Tsang | G11B 20/1426 341/58 |
| 2003/0102990 A1 | 6/2003 | Tsang | |
| 2005/0174262 A1 * | 8/2005 | Lee | G11B 20/1426 341/58 |
| 2006/0164263 A1 * | 7/2006 | Park | H03M 5/145 341/50 |
| 2008/0141095 A1 | 6/2008 | Cai et al. | |
| 2008/0284624 A1 * | 11/2008 | Cideciyan | G11B 20/1426 341/59 |
| 2009/0128378 A1 * | 5/2009 | Cideciyan | G11B 20/10055 341/59 |
| 2015/0310889 A1 * | 10/2015 | Cai | G11B 20/1403 360/41 |

* cited by examiner

SYSTEMS AND METHODS FOR DECODING USING RUN-LENGTH LIMITED (RLL) CODES

CROSS-REFERENCE TO RELATED APPLICATIONS

The present disclosure is a divisional of U.S. patent application Ser. No. 14/694,401 (now U.S. Pat. No. 9,431,053), filed on Apr. 23, 2015, which claims the benefit of Singapore Patent Application No. 10201401781X, filed 24 Apr. 2014. The entire disclosures of the applications referenced above are incorporated herein by reference.

FIELD

The present disclosure generally relates to run-length limited (RLL) codes, and more particularly, to dc-free k constrained codes for hard disk drive (HDD) systems with dedicated servo.

BACKGROUND

Hard disk drive (HDD) systems with dedicated servo show potential to achieve higher recording density as compared to conventional servo systems that share the surface area of the medium with data on the same track. For example, by adding a dedicated servo recording layer in between the conventional perpendicular recording data layer and the soft-underlayer (SUL), nearly all the surface of the data layer can be used for data recording. However, one challenge of the dedicated servo system is the interference between the data signal recorded on the data layer and the servo signal recorded on the servo layer. In this regard, since the servo signal of the dedicated servo is designed at dc, the dc-free constrained codes have the ability to reduce the interference between the data and servo signals.

In HDD systems with dedicated servo, there are generally two types of code constraints to be satisfied in the channel sequences. Namely, the maximum run length limited (RLL) constraint (also known as the k constraint) and the dc-free constraint. The k constraint specifies the maximum number of consecutive zeros between two ones in the channel sequences to facilitate timing recovery of the channel readback signal. The dc-free constraint, on the other hand, is used to suppress the dc component of the channel sequences to reduce the interference between the data signal and the servo signal of the dedicated servo.

A straightforward way of constructing the k constrained code is by using table look-up. However, this approach cannot achieve high code rates as the size of the corresponding look-up tables will be huge and are not affordable for practical hardware application. In certain conventional methods, an enumerative coding scheme may be used to design high rate k constrained codes with long codeword lengths. However, it has been found that the enumerative coding scheme can lead to serious error propagation during decoding. A single error in the received word may result in massive amounts of decoded errors. In other conventional methods, an interleaving scheme may be used to achieve high code rates by interleaving coded and uncoded symbols, where the coded symbols are obtained from a low-rate k constrained base code. More recently, a nibble replacement coding technique has been disclosed which uses various k constrained codes that achieve higher code efficiencies than those disclosed previously. However, the nibble replacement method designs the k constrained codes in the non-return-to-zero-inverse (NRZI) format rather than in the non-return-to-zero (NRZ) format.

SUMMARY

A method of encoding an input data into a codeword that satisfies a k constraint includes partitioning the input data into a plurality of data blocks comprising a first data block and a plurality of remaining data blocks; performing a first analysis of the plurality of data blocks for modifying each of the plurality of remaining data blocks that satisfies a first predetermined criterion; performing a second analysis of the plurality of data blocks after the first analysis for modifying each of the plurality of data blocks that satisfies a second predetermined criterion; and converting each bit of the plurality of data blocks after the second analysis to produce the codeword in Non-Return-to-Zero (NRZ) format that satisfies the k constraint.

In other features, the performing a first analysis comprises replacing each of the plurality of remaining data blocks that satisfies the first predetermined criterion. The performing a second analysis comprises replacing each of the plurality of data blocks that satisfies the second predetermined criterion.

In other features, the first predetermined criterion comprises whether a current data block of the plurality of remaining data blocks has a decimal value less than a predetermined value.

In other features, the second predetermined criterion comprises whether a current data block of the plurality of data blocks contains a predetermined set of binary bits and whether a data block immediately before the current data block contains a predetermined bit at a predetermined bit position. The performing a second analysis comprises replacing each of the plurality of data blocks that satisfies the second predetermined criterion with a predetermined data block.

In other features, the predetermined set of binary bits contains all binary '1' bits, the predetermined bit at the predetermined bit position is a binary '1' bit at the least significant bit of the data block, and the predetermined data block contains all binary '0' bits.

In other features, the partitioning the input data comprises partitioning the input data into a plurality of single-bit data blocks and the plurality of data blocks comprising the first data block and the plurality of remaining data blocks, when the k constraint is an odd k constraint.

In other features, the number of single-bit data blocks corresponds to the number of data blocks.

In other features, the second predetermined criterion comprises whether a current data block of the plurality of data blocks contains a predetermined set of binary bits and whether a corresponding single-bit data block matches a predetermined bit. The performing a second analysis comprises replacing each of the plurality of data blocks that satisfies the second predetermined criterion with a predetermined data block.

In other features, the predetermined set of binary bits contains all binary '1' bits, the predetermined bit is a binary '1' bit, and the predetermined data block contains all binary '0' bits.

In other features, the method further comprises interleaving the plurality of single-bit data blocks and the plurality of data blocks after the second analysis to produce the codeword, that satisfies the k constraint.

In other features, the method further comprises encoding the input data with a dc-free constraint to produce the codeword in NRZ format that satisfies the k constraint and the dc-free constraint.

In other features, the input data is encoded with a dc-free constraint based on a guided scrambling technique, and wherein the codeword is selected based on a minimum squared weight selection criterion.

A method of decoding a codeword that satisfies a k constraint into an output data includes converting each bit of the codeword being in Non-Return-to-Zero (NRZ) format; extracting, from the converted codeword, a plurality of data blocks comprising a first data block and a plurality of remaining data blocks; performing a first analysis on the plurality of data blocks for modifying each of the plurality of data blocks that satisfies a first predetermined criterion; and performing a second analysis on the plurality of data block after the first analysis for modifying each of the plurality of data blocks that satisfies a second predetermined criterion to obtain the output data.

In other features, the performing a first analysis comprises replacing each of the plurality of data blocks that satisfies the first predetermined criterion. The performing a second analysis comprises replacing each of the plurality of data blocks that satisfies the second predetermined criterion.

In other features, the first predetermined criterion comprises whether a current data block of the plurality of data blocks contains a predetermined set of binary bits The performing a first analysis comprises replacing each of the plurality of data blocks that satisfies the first predetermined criterion with a predetermined data block.

In other features, the predetermined set of binary bits contains all binary '0' bits and the predetermined data block contains all binary '1' bits.

In other features, the second predetermined criterion comprises whether the most significant bit of the first data block has a predetermined bit.

In other features, the predetermined bit is a binary '1' bit.

In other features, the extracting from the converted codeword comprises extracting a plurality of single-bit data blocks and the plurality of data blocks comprising the first data block and the plurality of remaining data blocks, when the k constraint is an odd k constraint.

In other features, the number of single-bit data blocks corresponds to the number of data blocks.

In other features, the method further comprises concatenating the plurality of single-bit data blocks with the plurality of data blocks to obtain the output data after the modifying in the second analysis.

In other features, the codeword further satisfies a dc-free constraint.

An encoder for encoding an input data into a codeword that satisfies a k constraint includes a partitioning module configured to partition the input data into a plurality of data blocks comprising a first data block and a plurality of remaining data blocks; a first analysis module configured to perform a first analysis of the plurality of data blocks for modifying each of the plurality of remaining data blocks that satisfies a first predetermined criterion; a second analysis module configured to perform a second analysis of the plurality of data blocks after the first analysis for modifying each of the plurality of data blocks that satisfies a second predetermined criterion; and a conversion module configured to convert each bit of the plurality of data blocks after the second analysis to produce the codeword in Non-Return-to-Zero (NRZ) format that satisfies the k constraint.

A decoder for decoding a codeword that satisfies a k constraint into an output data includes a conversion module configured to convert each bit of the codeword being in Non-Return-to-Zero (NRZ) format; an extraction module configured to extract, from the converted codeword, a plurality of data blocks comprising a first data block and a plurality of remaining data blocks; a first analysis module configured to perform a first analysis on the plurality of data blocks for modifying each of the plurality of data blocks that satisfies a first predetermined criterion; and a second analysis module configured to perform a second analysis on the plurality of data block after the first analysis module for modifying each of the plurality of data blocks that satisfies a second predetermined criterion to obtain the output data.

A hard disk drive system includes a dedicated servo medium including a data recording layer and a servo layer; a spindle motor configured to rotate the dedicated servo medium; an encoder of claim 23 for encoding data to be stored on the data recording layer; and a write head coupled to the encoder and operable to write the codewords in Non-Return-to-Zero (NRZ) format from the encoder onto the data recording layer.

A hard disk drive system includes a dedicated servo medium including a data recording layer and a servo layer; a spindle motor configured to rotate the dedicated servo medium; a read head operable to read codewords from the data recording layer; and a decoder of claim 24 for decoding the codewords in Non-Return-to-Zero (NRZ) format read from the data recording layer.

BRIEF DESCRIPTION OF DRAWINGS

Examples of the present disclosure will be better understood and readily apparent to one of ordinary skill in the art from the following written description, by way of example only, and in conjunction with the drawings, in which.

DESCRIPTION

Examples of the present disclosure provide RLL coding methods for constructing RLL constrained codes with high efficiency (e.g., high code rate). In some examples, the RLL constraint imposed is the maximum RLL constraint, also known in the art as the k constraint. Therefore, k constrained codes with high efficiency are constructed. In further examples, the k constraint codes are further imposed with a dc-free constraint to construct highly efficient dc-free k constrained codes suitable for HDD systems with dedicated servo to reduce or minimize the interference between the data and servo signals. In this regard, the k constrained codes are constructed in Non-Return-to-Zero (NRZ) format (rather than Non-Return-to-Zero Inverted (NRZI) format) for facilitating easy construction of dc-free constrained codes as the dc-free constraint needs to be imposed on NRZ format data. Doing so advantageously avoids the use of NRZI to NRZ converter during encoding and the NRZI to NRZ converter during detection and decoding, thus simplifying the implementation complexity.

Figure 1:
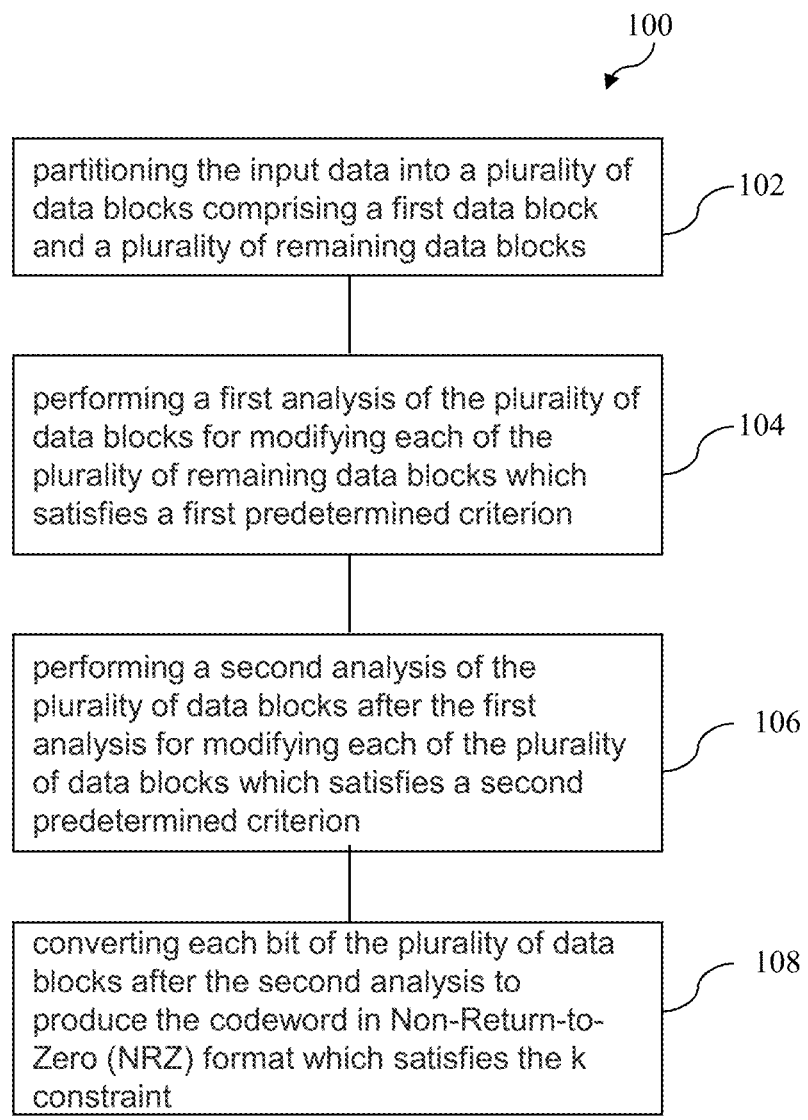
FIG. 1 depicts an overview of a method of encoding an input data into a codeword in NRZ format that satisfy a k constraint according to the present disclosure.

FIG. 1 depicts an overview of a method 100 of encoding an input data into a codeword (in NRZ format) that satisfy a k constraint according to the present disclosure. The method 100 comprises a step 102 of partitioning the input data into a plurality of data blocks comprising a first data block and a plurality of remaining data blocks, a step 104 of performing a first analysis of the plurality of data blocks for modifying each of the plurality of remaining data blocks that satisfy a first predetermined criterion, a step 106 of performing a second analysis of the plurality of data blocks after the first analysis for modifying each of the plurality of data blocks that satisfy a second predetermined criterion, and a step 108 of converting/modifying each bit of the plurality of data blocks after the second analysis to produce the codeword into NRZ format that satisfy the k constraint.

For a better understanding, the method 100 will now be described more fully with reference to FIGS. 2 and 3, in which examples of the disclosure are shown. This disclosure may, however, be embodied in many different forms and should not be construed as limited to the examples set forth herein. Rather, these examples are provided so that this disclosure will be thorough and complete, and will fully convey the scope of the disclosure to those skilled in the art.

Figure 2:
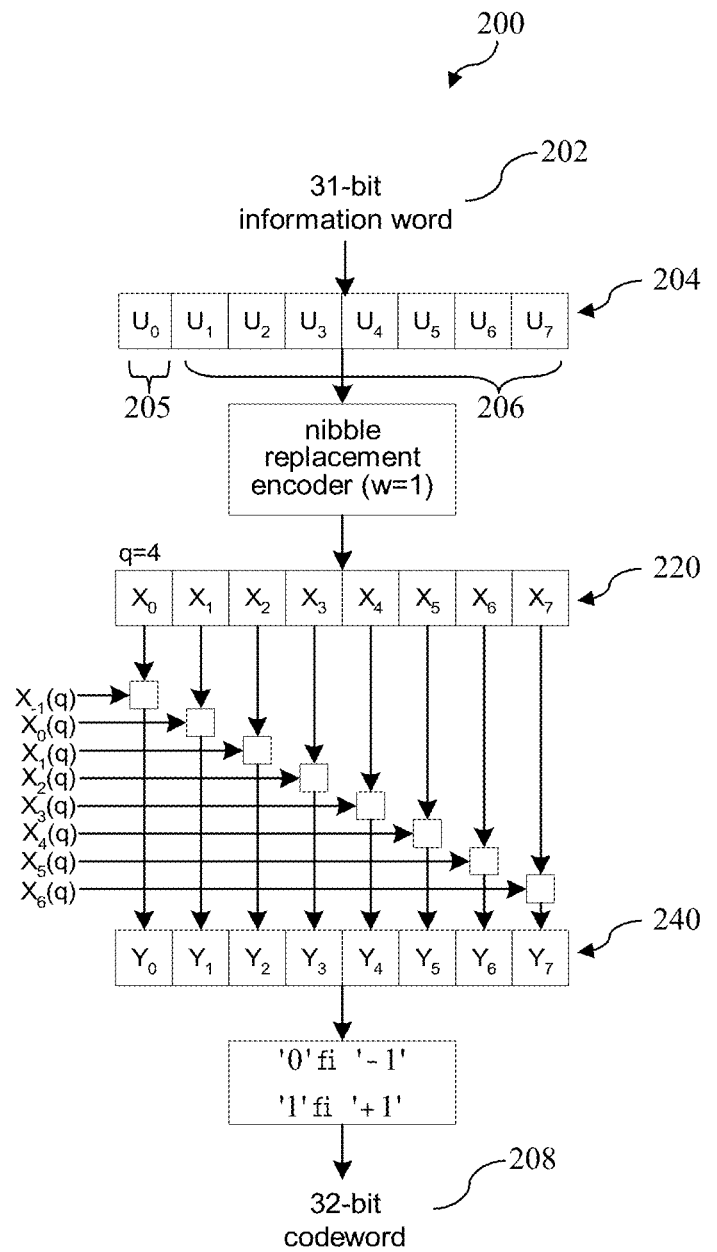
FIG. 2 depicts a schematic block diagram of an example of method of encoding an input data into a codeword in NRZ format that satisfy a k constraint according to the present disclosure, for the case where the k constraint is even.

FIG. 2 depicts a schematic block diagram of a method 200 of encoding an input data 202 into a codeword 208 (in NRZ format) that satisfy a k constraint according to an example embodiment of the present disclosure, for the case where the k constraint is even. The input data 202 may be an (n−1)-bit information word which is partitioned into a first data block 205 of (q−1)-bit (which may be referred to as a pivot data block) and subsequent/remaining (L−1) data blocks 206 of q-bit. It will be appreciated to a person skilled in the art that data blocks may also be referred to as nibbles. Accordingly, there are L blocks in the plurality of data blocks 204 and the input data 202 is encoded into a codeword 208 of n-bit in NRZ format that satisfy the k constraint. The integer n is a multiple of the integer q, that is, n=Lq, where q is the data block size and L is the number of q-bit data block 204 in a codeword 208. For example, as shown in FIG. 2, the input data 202 may be a 31-bit information word which is partitioned into a first/pivot data block 205 of 3-bit ($U_0$), and remaining 7 data blocks 206 of 4-bit ($U_1$ to $U_7$).

Subsequently, a first analysis of the plurality of data blocks 204 is performed. In the example embodiment, the first analysis corresponds to the encoding method of the nibble replacement technique disclosed in K.A.S. Immink, "High-Rate Maximum Runlength Constrained Coding Schemes Using Nibble Replacement", the contents of which is hereby incorporated by reference in its entirety for all purposes. Following the nibble replacement technique, a pivot bit equal to, for example, '1' is appended to the beginning of the first data block 205, thus obtaining a q-bit first data block 205. The value of the pivot bit may be determined by the encoder. The pivot bit indicates that at least one of the remaining data blocks 206 has been modified, for example, a binary '1' bit indicates that at least one remaining data block 206 has been modified, whereas a binary '0' bit indicates that none of the remaining data blocks 206 has been modified.

In other features, performing the first analysis comprises replacing each of the plurality of remaining data blocks 206 that satisfy the first predetermined criterion. In this regard, the sequence of remaining data blocks 206 are scanned to determine whether a current data block has a decimal value less than a predetermined value (w) (first predetermined criterion). For example, the predetermined value may be set to 1 as shown in FIG. 2, but it will be appreciated that the predetermined value may be set to other values as appropriate such as 2. A remaining data block which satisfy the first predetermined criterion may be referred to as an admissible data block or nibble, whereas a remaining data block which does not satisfy the first predetermined criterion may be referred to as an inadmissible data block or nibble.

In general, all inadmissible data blocks will be replaced with data blocks whose decimal representation is larger than or equal to the predetermined value (w). Therefore, all admissible data blocks will be transmitted without modification to the second analysis, whereas all inadmissible data blocks will be replaced according to the nibble replacement technique. In particular, the first found inadmissible data block is replaced with the first/pivot data block 205. After that, the pivot bit is set to binary '0' (to indicate that a remaining data block has been modified), and the address and the decimal value of the first found inadmissible data block are converted into binary data and stored in remaining q−1 bits of the first block 205. The first analysis then continues to scan and replace as long as the first predetermined criterion is met, until the end of the remaining data blocks 206. More specifically, the process treats a replaced data block as a pivot data block in a similar manner as performed in the first replacement, and a subsequently found inadmissible data block is replaced by the current pivot data block and so on until all inadmissible data blocks are replaced. In the example embodiment of FIG. 2, the plurality of data blocks 220 after the first analysis is represented as $X_0$ to $X_7$, which can then be subjected to the second analysis.

For illustration purposes only, an example of the nibble replacement technique will now be described. Let w=1, q=3 and L=4 and the input data='11 000 110 111'. It will be appreciated that the spaces between the data blocks are provided for clerical convenience. A binary '1' bit is appended to the first data block to obtain '111 000 110 111'. In this example, the only remaining data block that satisfy the first predetermined criterion is the data block '000' since this has a decimal value of 0 which is less than the predetermined value of 1. Therefore, this inadmissible data block is replaced with the first/pivot data block '111'. In addition, the first/pivot bit of the first/pivot data block is set to 0 and the remaining bits of the first/pivot data block is modified to store information indicating the address and decimal value of the inadmissible data block. Based on this, the first data block is modified to '001'. In this example, since no other remaining data blocks is found to satisfy the first predetermined criterion, no further modifications to the remaining data blocks are required. Therefore, the plurality of data blocks 220 after the first analysis is '001 111 110 111', which can then be subjected to the second analysis.

However, the above first analysis (i.e., the encoding method of the nibble replacement technique) generates an even k constrained sequence/codeword in NRZI format. According to examples of the present disclosure, it is noted that a k constraint in NRZI format allows at most k+1 number of consecutive '+1's or '−1's in the channel sequence in NRZ format. If a conversion of changing a '0' to a '−1' and a '1' to a '+1' is carried out in the channel sequence in NRZI format, the NRZ sequence obtained would have at most k number of consecutive '−1's, which do not violate the k constraint. However, the number of consecutive '+1's in the sequence obtained can be greater than k+1, hence violates the k constraint. To address this, the subsequent second analysis according to examples of the present disclosure prohibits the occurrence of greater than k+1 number of consecutive '+1's, and ensures that the maximum number of consecutive '+1's or '−1's is at most k+1 in the encoded NRZ sequence/codeword.

The second analysis according to the present disclosure will now be described. In other features, performing the second analysis comprises modifying/replacing each of the plurality of data blocks 220 that satisfy the second predetermined criterion. In this regard, the sequence of data blocks 220 from the first analysis are scanned to determine whether a current data block of the plurality of data blocks 220 contains a predetermined set of binary bits and whether a data block immediately before the current data block contains a predetermined bit at a predetermined bit position (second predetermined criterion). If so, the current data block is replaced with a predetermined data block. For example, the predetermined set of binary bits contains all binary '1' bits, the predetermined bit at the predetermined bit position is a binary '1' bit at the least significant bit of the data block, and the predetermined data block contains all binary '0' bits.

Referring to the example of FIG. 2, the plurality of data blocks 220 are represented by $X_i$, where i=0, 1, . . . L−1. In the example of FIG. 2, as mentioned above, L=8 and q=4. In the second analysis, the plurality of data blocks 220 is scanned to determine whether a current data block $X_i$ matches a predetermined set of binary bits, i.e., an all binary '1' data block of q-bit (i.e., whether $X_i$=[1111]), and whether a data block ($X_{i-1}$) immediately before the current data block contains a predetermined bit of "1" at the least significant bit (i.e., whether $X_{i-1}(q)=1$). If so, the current data block $X_i$ is replaced with the predetermined data block of all binary '0' data block of q-bit, i.e., [0000] and outputted as $Y_i$ having the modified/replaced value. Otherwise, the current data block $X_i$ is not modified and simply outputted as $Y_i$ having the same value as $X_i$ as shown in FIG. 2. In this way, a rate 31/32 and k=6 constrained codeword in NRZ format is obtained in the example. Note that the code rate is the same with that of the code that can be designed in NRZI format, and no advantageously NRZI to NRZ converter is needed during encoding.

Therefore, according to an example embodiment, the second analysis may be implemented by the following general equation:

For all i=L−1, if $X_i$=[11 . . . 1] and $X_{i-1}(q)$=1, set $Y_i$=[00 . . . 0];  Equation (1)

else set $X_i$=[00 . . . 0];
end

After performing the second analysis, each bit of the plurality of data blocks 240 obtained (i.e., $Y_0$ to $Y_7$) is converted to produce the n-bit codeword 208 in NRZ format that satisfy the k constraint (k even constraint). In a preferred embodiment, the binary '0' bit is converted to '−1' and the binary '1' bit is converted to '+1'.

Figure 3:
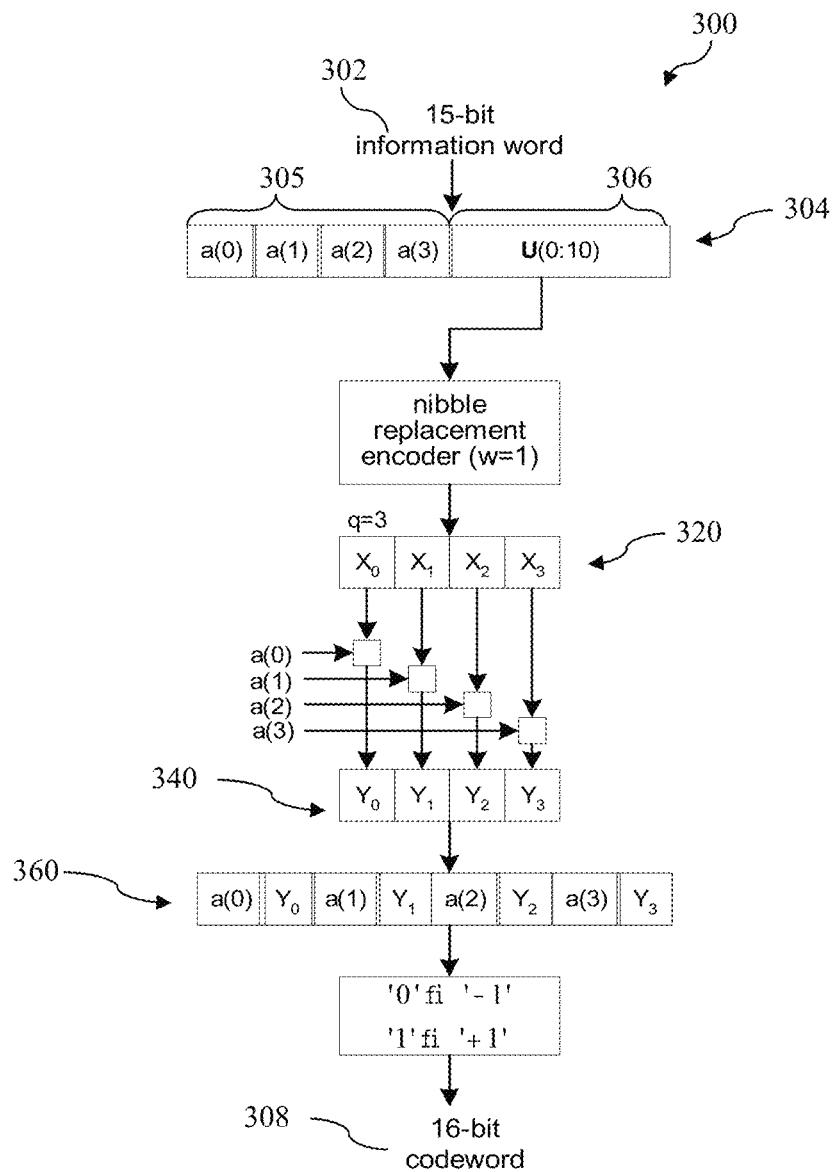
FIG. 3 depicts a schematic block diagram of an example of method of encoding an input data into a codeword in NRZ format that satisfy a k constraint according to according to the present disclosure, for the case where the k constraint is odd.

FIG. 3 depicts a schematic block diagram of a method 300 of encoding an input data 302 into a codeword 308 (in NRZ format) that satisfy a k constraint according to an example embodiment of the present disclosure, for the case where the k constraint is odd. In this case, the input data 302 is partitioned into a plurality of single-bit data blocks 305 and a plurality of data blocks (multi-bit data blocks) 306 comprising a first data block and a plurality of remaining data blocks. For example, as shown in FIG. 3, the input data 302 may be a 15-bit information word 302 which is partitioned into 4 single-bit data blocks 305 ($a_0$, $a_1$, $a_2$, and $a_3$) and 4 multi-bit data blocks 306 having bits represented as $U_0$ to $U_{10}$. In this example, the multi-bit data blocks 306 comprise a first data block of (q−1)-bits (i.e., 2 bits) and 3 remaining data blocks each of q-bits (i.e., 3 bits). Therefore, the number of single-bit data blocks corresponds to the number of multi-bit data blocks.

In the example embodiment, the length of the plurality of data blocks 306 is set to be $n_{even}−1$, which is equal to the information word length of a code with an even $k_{even}$ constraint, and the number (L) of multi-bit data blocks 306 is set to be equal to that of the corresponding $k_{even}$ constrained code. Therefore, the code word length at the output of the encoder is given by $n_{odd}=n_{even}+L$.

Subsequently, a first analysis is performed on the plurality of data blocks 306 in the same manner as described hereinbefore with reference to FIG. 2. That is, the plurality of data blocks 306 is encoded into an even $k_{even}$ constrained codeword by using the nibble replacement technique as described hereinbefore to obtain L data blocks ($X_0$, $X_1$, $X_2$, and $X_3$) 320. The nibble replacement technique will not be repeated for clarity and conciseness.

Similarly, the above first analysis (i.e., the encoding method of the nibble replacement technique) generates an odd k constrained sequence/codeword in NRZI format. According to examples of the present disclosure, it is noted that if a conversion of changing a '0' to a '−1' and a '1' to a '+1' is carried out in the channel sequence in NRZI format, the NRZ sequence obtained would have at most k number of consecutive '−1's, which do not violate the k constraint. However, the number of consecutive '+1's in the sequence obtained can be greater than k+1, hence violates the k constraint. To address this, the subsequent second analysis according to examples of the present disclosure prohibits the occurrence of greater than k+1 number of consecutive '+1's, and ensures that the maximum number of consecutive '+1's or '−1's is at most k+1 in the encoded NRZ sequence/codeword.

The second analysis according to the present disclosure will now be described. In other features, performing the second analysis comprises modifying/replacing each of the plurality of data blocks 320 that satisfy the second predetermined criterion. In this regard, the sequence of data blocks 320 from the first analysis are scanned to determine whether a current data block of the plurality of data blocks 320 contains a predetermined set of binary bits and whether a corresponding single-bit data block contains a predetermined bit (the second predetermined criterion). If so, the current data block is replaced with a predetermined data block. For example, the predetermined set of binary bits contains all binary '1' bits, the predetermined bit is a binary '1' bit, and the predetermined data block contains all binary '0' bits.

Referring to the example of FIG. 3, in the second analysis, the plurality of data blocks 320 is scanned to determine whether a current data block $X_i$ matches a predetermined set of binary bits, i.e., an all binary '1' data block of q-bit (i.e., whether $X_i$=[111]), and whether a corresponding single-bit data block $a_i$ matches a predetermined bit (i.e., binary '1' bit) (i.e., whether $a_i$=1). If so, the current data block $X_i$ is replaced with the predetermined data block of all binary '0' data block of q-bit, i.e., [000] in this example and outputted as $Y_i$ having the modified/replaced value. Otherwise, the current data block $X_i$ is not modified and simply outputted as $Y_i$ having the same value as $X_i$. In this way, a rate 15/16 and k=5 constrained code in NRZ format is obtained in the example. Note that the code rate is the same with that of the code that can be designed in NRZI format, and advantageously, no NRZI to NRZ converter is needed during encoding.

Therefore, according to an example embodiment, the second analysis may be implemented by the following general equation:

For all $i=L-1$, if $X_i$=[11 . . . 1] and $a_i$=1, set $Y_i$=[00 . . . 0]; Equation (2)

else set $X_i$=[00 . . . 0];
end

After performing the second analysis, the plurality of data blocks 340 obtained (i.e., $Y_0$ to $Y_7$) is interleaved with the plurality of single-bit blocks 305 correspondingly to obtain a combined codeword 360, preferably in the format of $[a_0Y_0a_1Y_1 \ldots a_{L-1}Y_{L-1}]$ as shown in FIG. 3. Subsequently, each bit of the combined codeword 360 is converted to produce the n-bit codeword 308 in NRZ format that satisfy the k constraint (k odd constraint). In a preferred embodiment, the binary '0' bit is converted to '−1' and a binary '1' bit is converted to '+1'.

Figure 4:
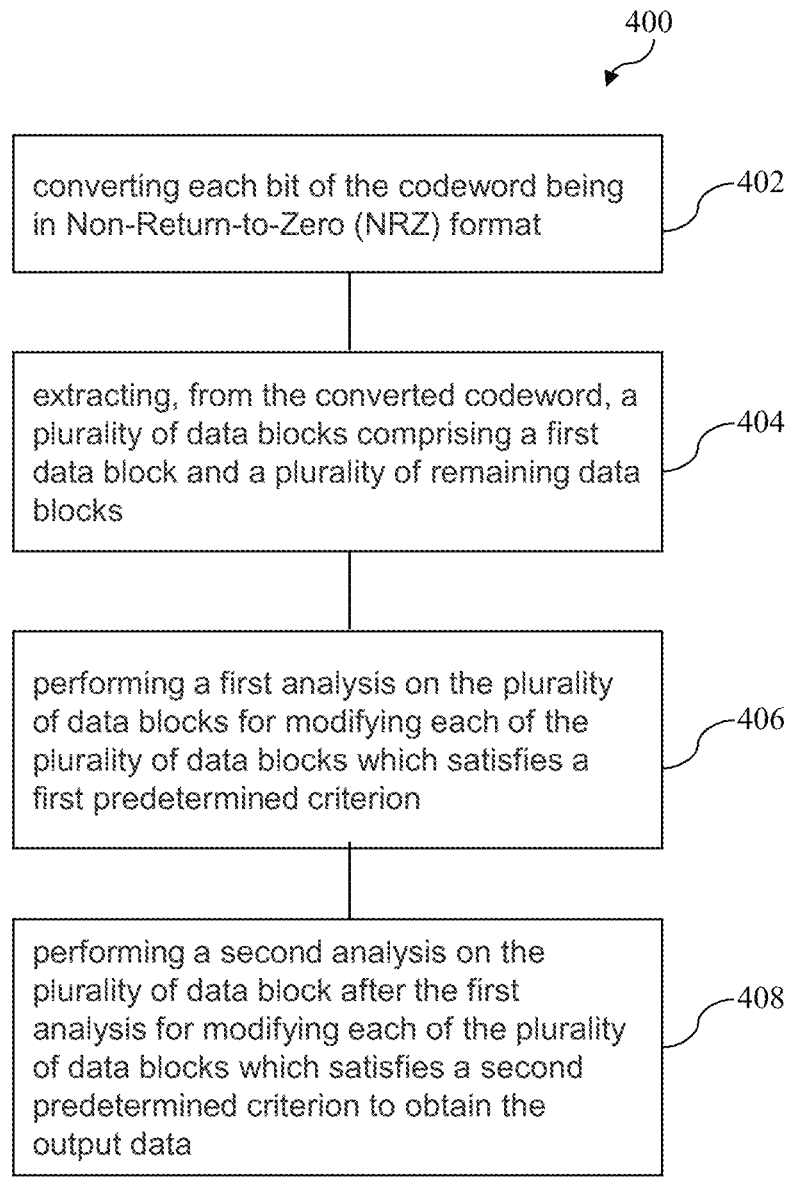
FIG. 4 depicts an overview of an example of method of decoding a codeword in NRZ format that satisfy a k constraint into an output data according to the present disclosure.

FIG. 4 depicts an overview of a method 400 of decoding a codeword (in NRZ format) that satisfy a k constraint into an output data according to the present disclosure. The method 400 comprises a step 402 of converting/modifying each bit of the codeword 208, 308 being in NRZ format, a step 404 of extracting, from the converted codeword, a plurality of data blocks comprising a first data block and a plurality of remaining data blocks, a step 406 of performing a first analysis on the plurality of data blocks for modifying each of the plurality of data blocks that satisfy a first predetermined criterion, and a step of 408 performing a second analysis on the plurality of data block after the first analysis for modifying each of the plurality of data blocks that satisfy a second predetermined criterion to obtain the output data.

For a better understanding, the method 400 will now be described more fully with reference to FIGS. 5 and 6, in which examples of the disclosure are shown. This disclosure may, however, be embodied in many different forms and should not be construed as limited to the examples set forth herein. Rather, these examples are provided so that this disclosure will be thorough and complete, and will fully convey the scope of the disclosure to those skilled in the art.

Figure 5:
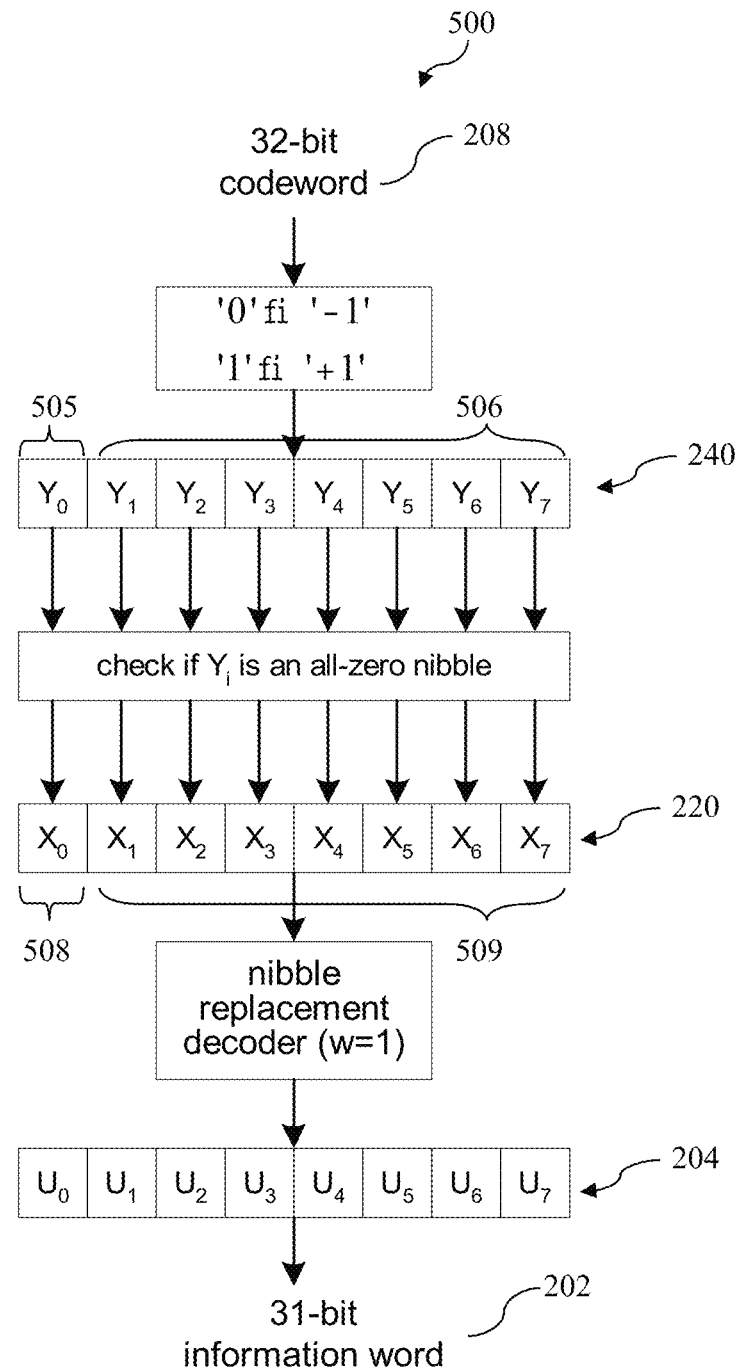
FIG. 5 depicts a schematic block diagram of an example of method of decoding a codeword in NRZ format that satisfy a k constraint into an output data according to according to the present disclosure, for the case where the k constraint is even.

FIG. 5 depicts a schematic block diagram of a method 500 of decoding a codeword 208 (in NRZ format) that satisfy a k constraint into an output data 202 according to an example embodiment of the present disclosure, for the case where the k constraint is even. The received codeword 208 may be an n-bit codeword 208 which is first modified by converting bit '−1' to '0' and bit '+1' to '1' in the received n-bit codeword 208.

Subsequently, a plurality of data blocks, comprising a first data block 505 and a plurality of remaining data blocks 506, is extracted from the modified/converted codeword. In the example shown in FIG. 5, a first data block 505 of q-bit (which may be referred to as a pivot data block) and subsequent/remaining (L−1) data blocks 506 of q-bit are extracted from the converted n-bit codeword, where q=4, L=8 and n=32. The integer n is a multiple of integer q, that is, n=Lq, where q is the data block size and L is the number of q-bit data blocks. For example, as shown in FIG. 5, the received data 208 may be a 32-bit codeword and the first data block 505 and the remaining 7 data blocks 506 extracted/retrieved may be 4-bit each.

A first analysis is then performed on the plurality of data blocks 240 for modifying each of the plurality of data blocks 240 that satisfy a first predetermined criterion. In other features, performing the first analysis comprises modifying/replacing each of the plurality of data blocks 240 that satisfy the first predetermined criterion. In this regard, the sequence of data blocks 240 are scanned to determine whether a current data block of the plurality of data blocks 240 contains a predetermined set of binary bits. If so, the current data block is replaced with a predetermined data block. For example, the predetermined set of binary bits contains all binary "0" bits and the predetermined data block contains all binary "1" bits.

Referring to the example of FIG. 5, the plurality of data blocks 240 are represented by $Y_0$ to $Y_7$. In the first analysis, the plurality of data blocks 240 are scanned to determine whether a current data block $Y_i$ contains a predetermined set of binary bits, which in this example is an all binary '0' data block of q-bit (i.e., whether $Y_i$=[0000]). If so, the current data block $Y_i$ is replaced with the predetermined data block of all binary "1" data block of q-bit, i.e., [1111] and outputted as $X_i$ having the replaced/modified value. Otherwise, the current data block $Y_i$ is not modified and simply outputted as $X_i$ having the same value as $Y_i$ as shown in FIG. 5. it can be appreciated that the above decoding process is the inverse of the second analysis of the encoding process illustrated in FIG. 2. During decoding, an all binary '0' data block of q-bit (i.e., whether $Y_i$=[0000]) can be confirmed to be generated during the second analysis of the encoding process shown in FIG. 2, as the first analysis of the encoding process (i.e., the encoding method of the nibble replacement) would forbid the generation of an all binary '0' data block of q-bit.

Therefore, according to an example embodiment, the first analysis of the decoding process may be implemented by the following general equations:

For all $i=L-1$, if $Y_i=[00 \ldots 0]$, set $X_i=[11 \ldots 1]$;  Equation (3)

else set $X_i=Y_i$;
end

Subsequently, a second analysis is performed on the plurality of data blocks 220 after the first analysis for modifying each of the plurality of data blocks 220 that satisfy a second predetermined criterion. In the example embodiment, the second analysis corresponds to the decoding method of the nibble replacement technique disclosed in K.A.S. Immink as mentioned hereinbefore, the contents of which has been incorporated by reference in its entirety for all purposes. In particular, following the decoding method of the nibble replacement technique, the second predetermined criterion comprises whether the most significant bit of the first data block 508 has a predetermined bit. In other features, the most significant bit of the first data block 508 is the first/pivot bit and the predetermined bit is a binary '1' bit. In this case, if the pivot bit of the first data block 508 is a binary '1' bit, the (n−1)-bit information word (output data) can be recovered by simply removing the pivot bit. This is because a pivot bit having a value of '1' indicates that no modifications were made to the original (n−1)-bit information word during encoding. On the other hand, if the pivot bit is a binary "0" bit, the decoding process recursively replaces the data blocks 220 that were replaced/modified during the encoding process based on the address and decimal values stored in the replaced/modified data blocks. The decoding process halts when the most significant bit of a replaced/modified data block equals binary '1' and outputs the original information word (output data) 202.

Figure 6:
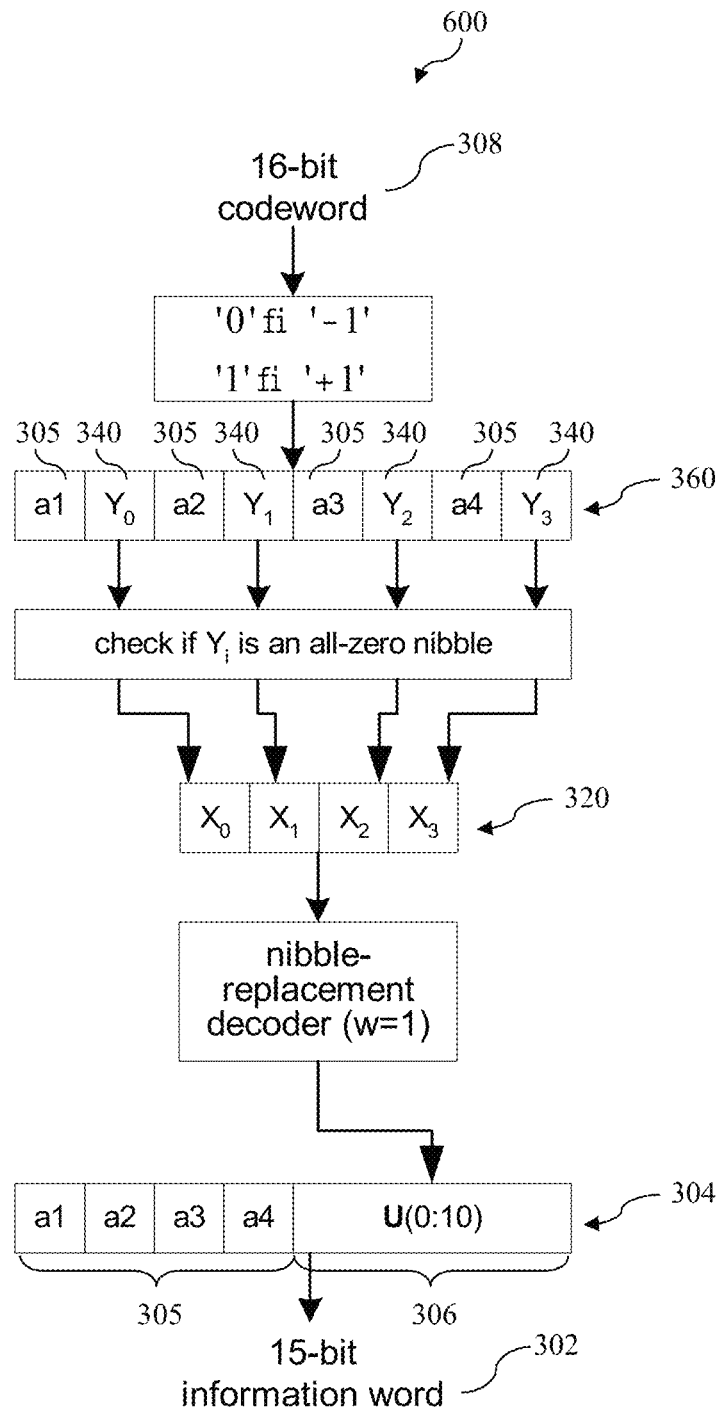
FIG. 6 depicts a schematic block diagram of an example of method of decoding a codeword in NRZ format that satisfy a k constraint into an output data according to the present disclosure, for the case where the k constraint is odd.

FIG. 6 depicts a schematic block diagram of a method 600 of decoding a codeword (in NRZ format) that satisfy a k constraint into an output data according to an example embodiment of the present disclosure, for the case where the k constraint is odd. The received codeword may be an n-bit codeword 308 which is first modified by converting bit '−1' to '0' and bit '+1' to '1' in the received n-bit codeword 308.

Subsequently, a plurality of single-bit data blocks 305 and a plurality of data blocks (multi-bit data blocks) 340 are extracted/retrieved from converted codeword. The plurality of data blocks 340 comprises a first data block and a plurality of remaining data blocks. In the example shown in FIG. 6, the received codeword 308 may be a 16-bit codeword from which is extracted 4 single-bit data blocks ($a_0$, $a_1$, $a_2$, and $a_3$) 305 and 4 data blocks ($Y_0$, $Y_1$, $Y_2$, $Y_3$) 340.

A first analysis is then performed on the plurality of data blocks 340 for modifying each of the plurality of data blocks that satisfy a first predetermined criterion in the same manner as described hereinbefore with reference to FIG. 5 and thus will not be repeated for clarity and conciseness. After the first analysis, a plurality of data blocks $X_0$ to $X_3$ 320 is obtained as shown in FIG. 6.

Subsequently, a second analysis is performed on the plurality of data blocks ($X_0$ to $X_3$) 320 after the first analysis for modifying each of the plurality of data blocks that satisfy a second predetermined criterion. In particular, the plurality of data blocks Xi is decoded using the decoding method of the nibble replacement technique as described hereinbefore and thus will not be repeated for clarity and conciseness. After the second analysis, a plurality of data blocks containing $U_0$ to $U_{10}$ is obtained as shown in FIG. 6.

The plurality of data blocks output from the second analysis is then concatenated with the plurality of single-bit data blocks 305 as shown in FIG. 6 to recover the (n−1)-bit original information word (output data) 302. In the example, the single-bit data blocks $a_0 a_1 a_2 a_3$ are concatenated with the plurality of multi-bit data blocks containing bits $U_0$ to $U_{10}$ to obtain output data $a_0 \ldots a_3 U_0 \ldots U_{10}$.

As mentioned hereinbefore, in further examples, the k constraint codes are further imposed with a dc-free constraint to construct highly efficient dc-free k constrained codes suitable for HDD systems with dedicated servo to reduce or minimize the interference between the data and servo signals. In this regard, according to an embodiment, the method 100 further comprises encoding the input data with a dc-free constraint to produce the codeword that satisfy the k constraint and the dc-free constraint. In other features, the input data is encoded with a dc-free constraint based on a guided scrambling (GS) technique and the codeword is selected based on a minimum squared weight (MSW) selection criterion. For a better understanding, the method 100 of this embodiment will now be described in further details with reference to FIG. 7, in which an example of the disclosure is shown. This disclosure may, however, be embodied in many different forms and should not be construed as limited to the example. Rather, the example is provided so that this disclosure will be thorough and complete, and will fully convey the scope of the disclosure to those skilled in the art.

Figure 7:
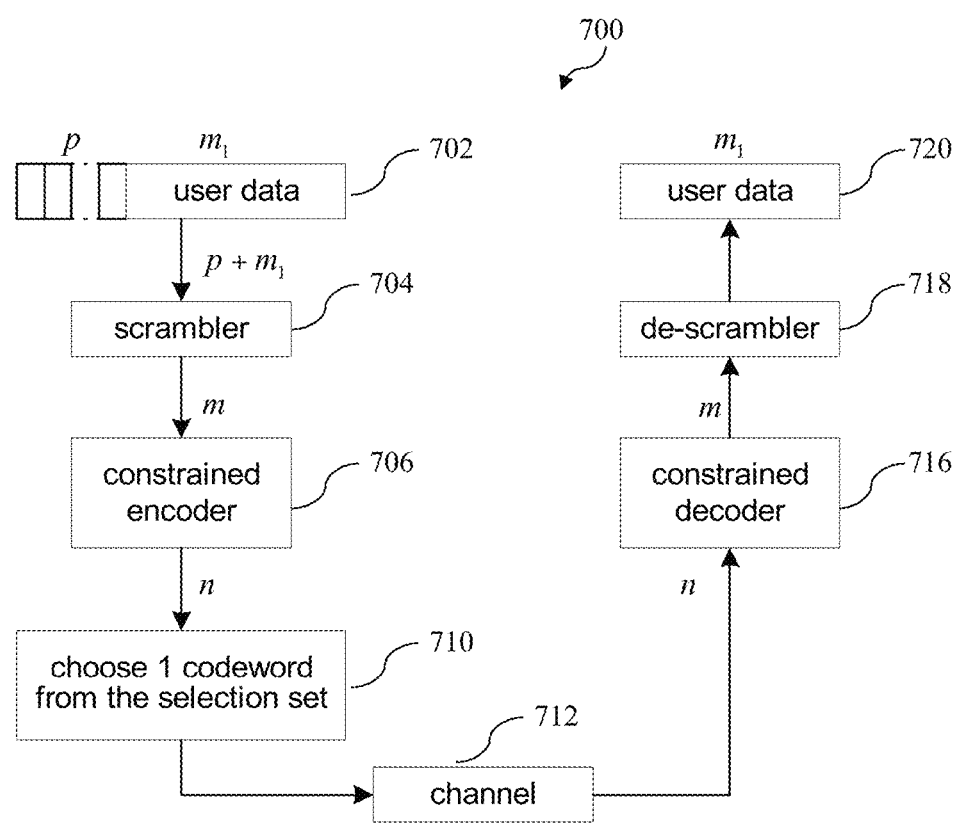
FIG. 7 depicts a schematic block diagram of an example of method of encoding and decoding of dc-free k constrained codes according to the present disclosure.

FIG. 7 depicts a schematic block diagram of a method 700 of encoding and decoding of dc-free k constrained codes according to an example embodiment of the present disclosure. In this example embodiment, the GS technique is used to generate the dc-free codes because it was found to be a very efficient method to suppress the dc component of the channel sequence. The GS technique is known in the art and thus need not be described in detail herein. In this example embodiment, the GS technique is combined with the above-described k constrained coding techniques by appending p binary redundant bits to each information word, and thus each information word can be represented by a member of a selection set consisting of $2^p$ codewords. After that, the "best" codeword in the selection set is selected to be transmitted over the channel 712 according to a selection criterion (preferably based on a MSW selection criterion, which will be described later below) that suppresses the dc component of the channel sequence.

Referring to FIG. 7, during encoding, the $m_1$ user data bits 702 are appended with p redundant bits, to generate a selection set of $2^p$ super blocks. The $p+m_1=n-1$ bits super block is then scrambled using a feedback register scrambler 704. After that, the scrambled super block is converted into n-bits k constrained code (in NRZ format) through a k constrained encoder 706 in the same manner as described hereinbefore with reference to FIG. 2 or 3 according to examples of the present disclosure. The above scrambling and encoding steps are repeated $2^p$ times for all possible combinations of the p redundant bits. A selection module 710 then chooses and transmits one codeword preferably according to a MSW selection criterion as will be described below that suppresses the dc component of the channel sequence.

During decoding, the codewords received/detected from the channel 712 is first input into a k constrained decoder 716 for decoding in the same manner as described hereinbefore with reference to FIG. 4 or 5 according to examples of the present disclosure. The decoded data block is then de-scrambled through a de-scrambler 718. After removing the p redundant bits, the input information word 720 is recovered.

In the above method 700 to design dc-free k constrained codes, the selection criterion to select the "best" word from the selection set helps to achieve efficient dc suppression. In this regard, conventionally, the most widely used criterion for the design of dc-free codes is the minimum running digital sum (MRDS) criterion imposed at the end of each codeword. However, although the RDS reflects the disparity of the channel sequence, it does not directly represent the energy of the channel sequence at dc. Therefore, to address this problem and against conventional teaching, the example embodiment uses the minimum squared weight (MSW) criterion for choosing a codeword which has been surprisingly found to result in more dc suppression than the conventional MRDS criterion, for a given number of redundant bits p. Without wishing to be bound by theory, it is believed that this is because the sum of the squared RDS values at each bit position of the codeword, defined as $$w_{sq} = \sum_{i=-\infty}^{n} z_i^2, \quad (4)$$

shows exactly the energy of the channel sequence at dc.

Figure 8:
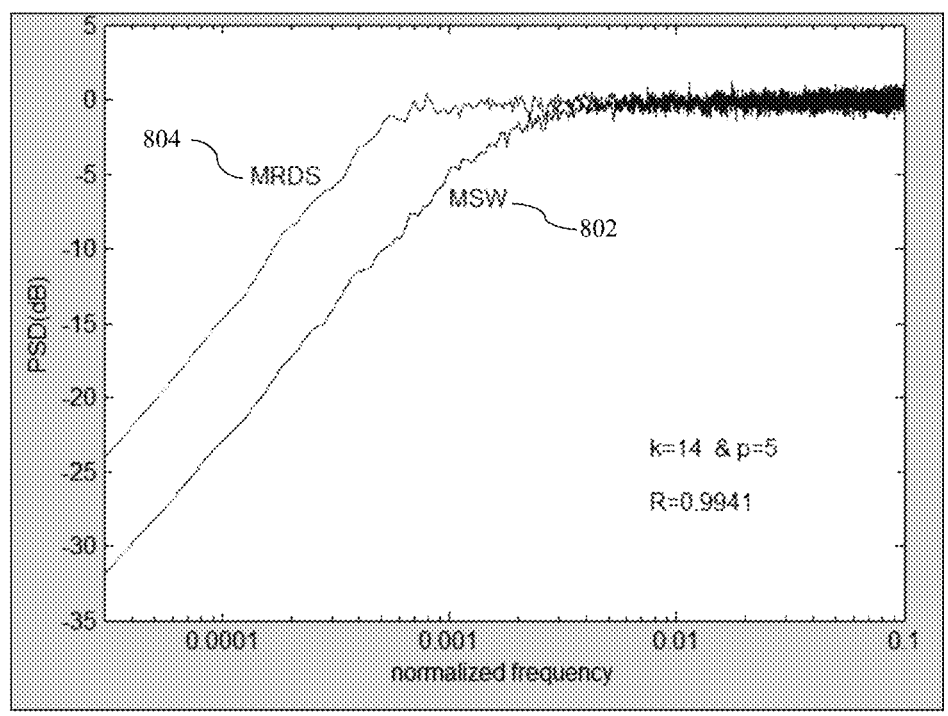
FIG. 8 depicts a plot of an example of the power spectrum densities (PSD) of a designed rate R=0.9941, k=14 dc-free constrained code with a fixed p=5, but with different selection criteria for the guided scrambling (GS) technique.

As an example illustration, FIG. 8 depicts a plot of the power spectrum densities (PSD) of a designed rate R=0.9941, k=14 dc-free constrained code with a fixed p=5, but with different selection criteria for GS (i.e., MSW and MRDS criteria) to illustrate the difference in dc suppression between the two criteria. As can be seen, the MSW criterion 802 gains over the MRDS criterion 804 by around 8 dB more dc suppression. This corresponds to 2.5 times reduction in the signal amplitude. Therefore, adopting the MSW criterion to select the best codeword in the GS technique has been found to advantageously result in significantly better dc suppression.

Figure 9A:
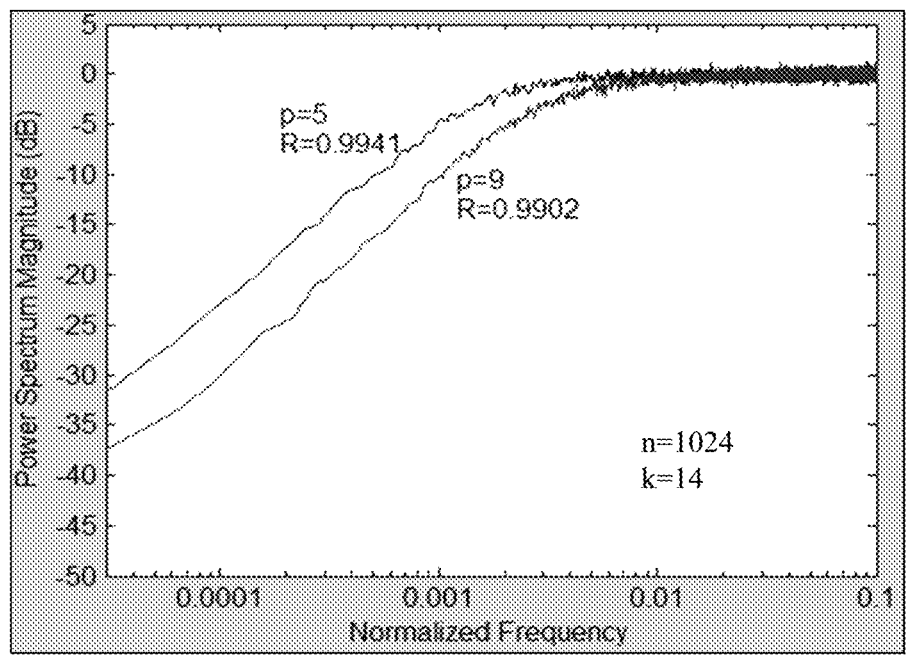
FIGS. 9A and 9B depict plots of an example of the PSDs of dc-free k constrained codes according to the present disclosure.
Figure 9B:
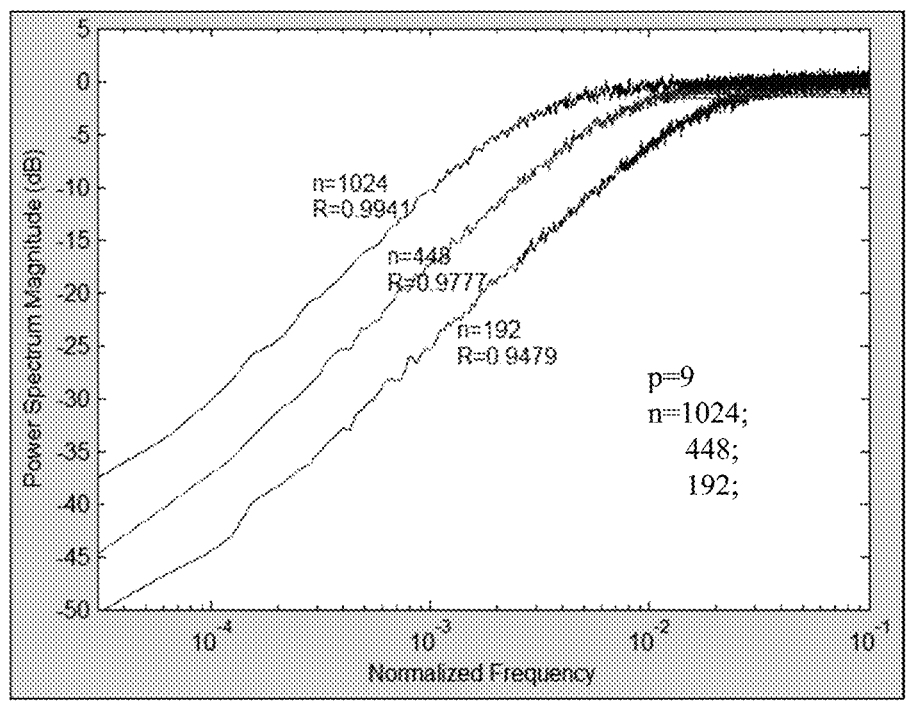

Further simulation results will now be disclosed for illustration purposes. By using the code design methods as described hereinbefore according to examples of the present disclosure, various dc-free constrained codes fitting to different data storage systems can be designed. FIGS. 9A and 9B illustrate the PSDs of some examples of dc-free k constrained codes designed according to example examples of the present disclosure. From FIG. 9A, it can be observed that for a fixed codeword length n and hence the k constraint, the amount of dc suppression increases with increase of p. However, increasing p would lead to more code rate loss. On the other hand, as can be seen from FIG. 9B, for a fixed number of redundant bits p, the amount of dc suppression increases with decrease of n (hence the k constraint). However, decreasing n while fixing p would also lead to more code rate loss. In practical dedicated servo system, depending on the level of the interference between the data layer and the servo layer, the codeword length n and the number of redundant bits p should be chosen to achieve a satisfactory level of dc suppression which can be indicated by the PSD of the repeatable runout (RRO) of the system. The RRO is a key parameter indicating the interference to the servo system of HDDs. The higher the RRO PSD, the larger the level of interference, and the less accurate of the performance of the servo system.

Figure 10A:
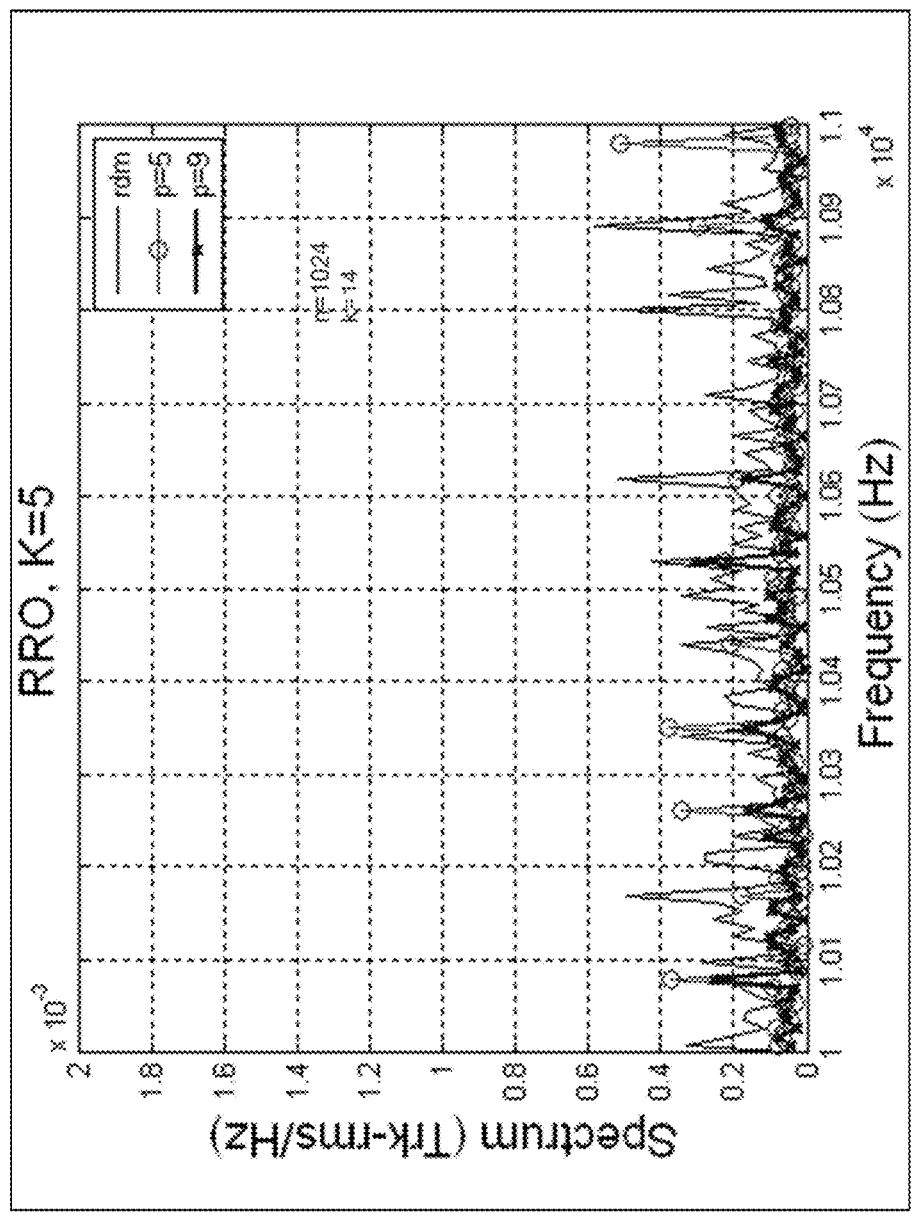
FIGS. 10A to 10C depict plots of an example of RRO spectrum results of dc-free k constrained codes according to the present disclosure.
Figure 10B:
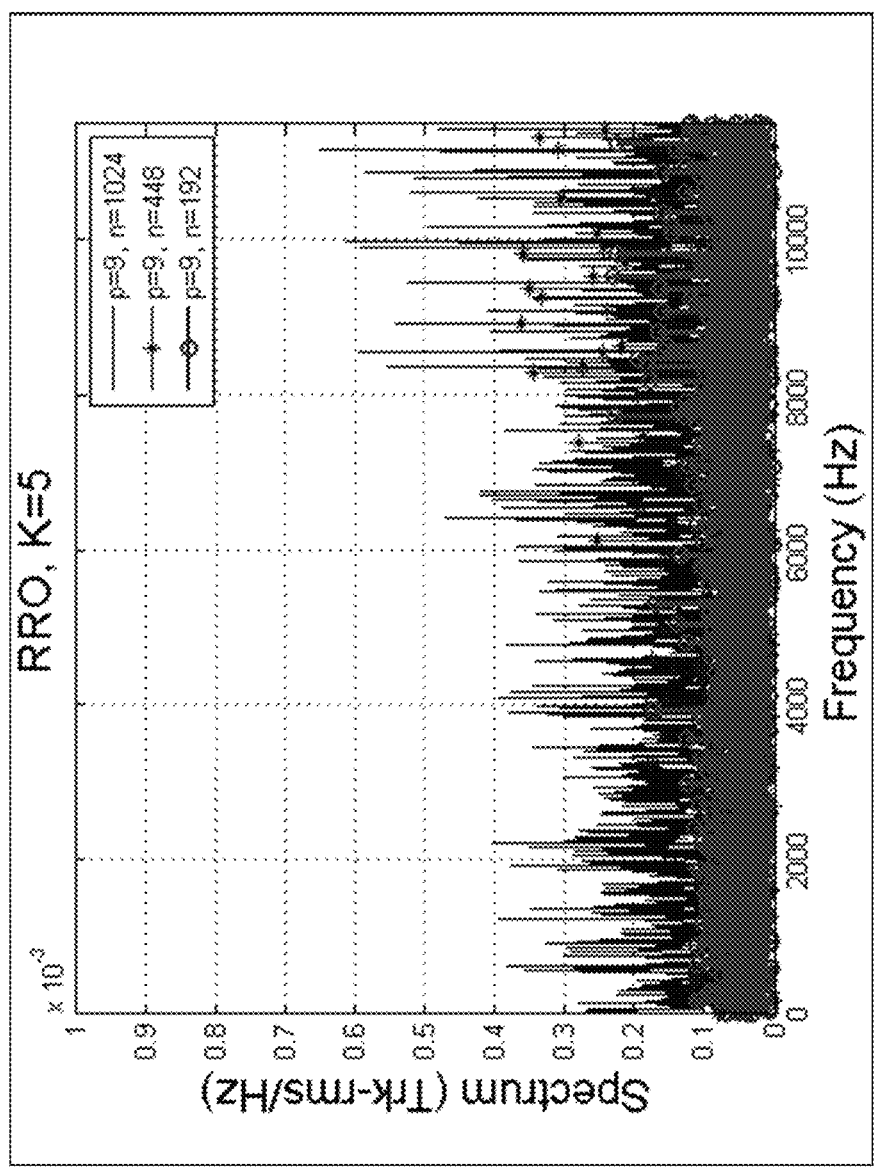
Figure 10C:
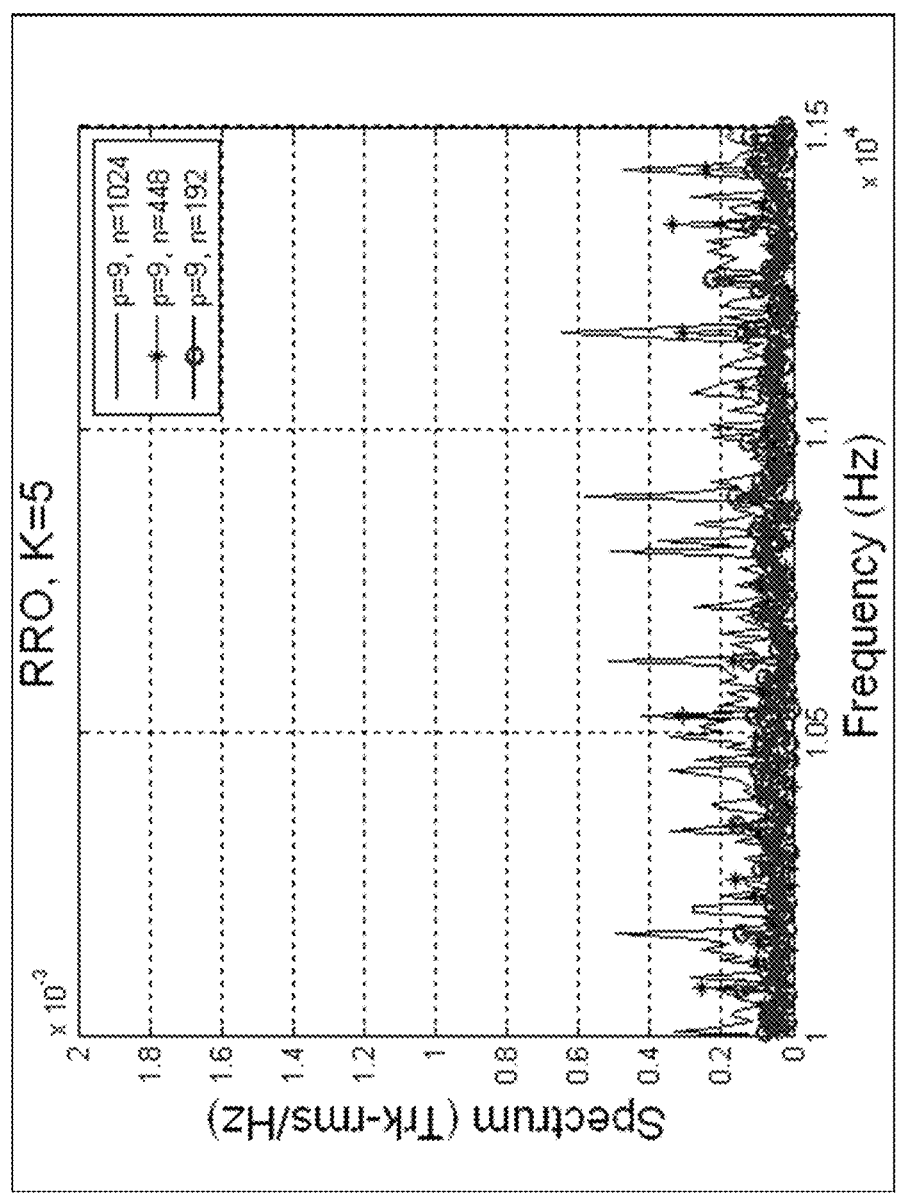

RRO simulations were carried out for dedicated servo with the newly designed dc-free k constrained codes, and the obtained RRO spectrum with random data and with dc-free codes are shown in FIG. 10A and FIG. 10B. Note that FIG. 10C shows the expanded view of FIG. 10B with frequency restricted to 0~11.5 KHz. During the RRO simulations, the data to servo ratio is set to K=5 (i.e. amplitude of data signal is 5 times of servo signal amplitude). Each set of data sequence consists of 700×4096 or 700×4032 code bits. Each 1 set of 4096 or 4032 bits are used to estimate 1 position error signal (PES) point, thus leading to 700 PES points each revolution. The revolutions per minute (RPM) is set to 5400, and the servo sampling rate is 63K Hz. As can be seen, the RRO simulations results show that codes with more dc suppression result in better RRO performance. This will advantageously lead to less track offset and track misregistration, and hence improve the data recovery performance of dedicated servo. Note that the profile of the RRO PSD with dc-free codes shows a triangle shape, unlike the square shape of that with the random data (see FIG. 10A). This indicates that the total noise power with dc-free codes is even smaller than that shown by the maximum amplitude of RRO spectrum. In practice, the choice of a specific dc-free k constrained codes depends on the amount of dc-suppression required by the system and the affordable code rate loss.

Figure 11:
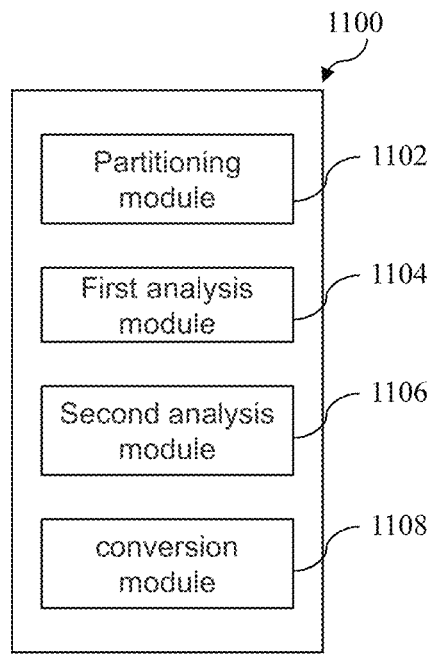
FIG. 11 depicts a schematic block diagram of an example of an encoder for encoding an input data into a codeword in NRZ format with a k constraint according to the present disclosure.

According to the present disclosure, there is provided an encoder 1100 for encoding an input data into a codeword (in NRZ format) with a k constraint, corresponding to method 100 as described hereinbefore with reference to FIG. 1. As schematically illustrated in FIG. 11, the encoder 1100 comprises a partitioning module 1102 configured to partition the input data into a plurality of data blocks comprising a first data block and a plurality of remaining data blocks, a first analysis module 1104 configured to perform a first analysis of the plurality of data blocks for modifying each of the plurality of remaining data blocks that satisfy a first predetermined criterion, a second analysis module 1106 configured to perform a second analysis of the plurality of data blocks after the first analysis for modifying each of the plurality of data blocks that satisfy a second predetermined criterion, and a conversion module 1108 configured to convert/modify each of the plurality of data blocks after the second analysis to produce the codeword in NRZ format with the k constraint.

Figure 12:
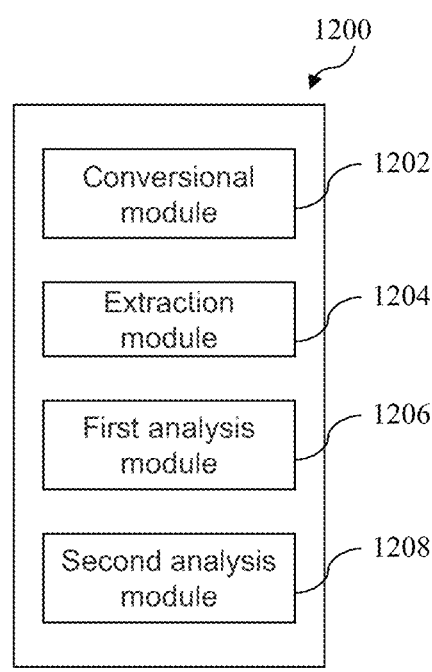
FIG. 12 depicts a schematic block diagram of an example of a decoder for decoding a codeword in NRZ format with a k constraint into an output data according to the present disclosure.

According to the present disclosure, there is provided a decoder 1200 for decoding a codeword with a k constraint into an output data, corresponding to method 400 as described hereinbefore with reference to FIG. 4. As schematically illustrated in FIG. 12, the decoder 1200 comprising a conversion module 1202 configured to convert/modify each bit of the codeword being in NRZ format, an extraction module 1204 configured to extract, from the converted codeword, a plurality of data blocks comprising a first data block and a plurality of remaining data blocks, a first analysis module 1206 configured to perform a first analysis on the plurality of data blocks for modifying each of the plurality of data blocks that satisfy a first predetermined criterion, and a second analysis module 1208 configured to perform a second analysis on the plurality of data block after the first analysis module for modifying each of the plurality of data blocks that satisfy a second predetermined criterion to obtain the output data.

It will be appreciated to a person skilled in the art that the encoder 1100 and decoder 1200 may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Figure 13:
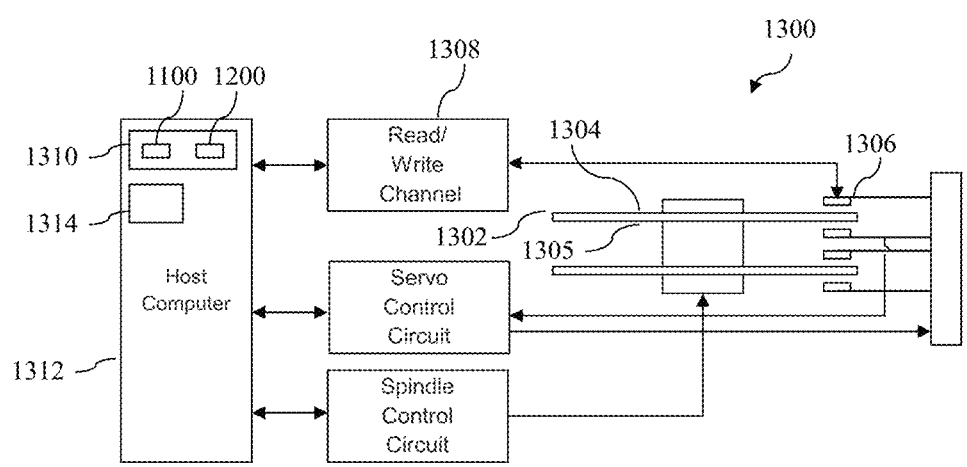
FIG. 13 depicts a simplified schematic block diagram of an example of a hard disk drive system according to the present disclosure.

In a preferred embodiment, there is provided a hard disk drive system 1300 having incorporated therein the above-described encoder 1100 for encoding an input data into a codeword in NRZ format with a k constraint to be stored on a disk and/or the above-described decoder 1200 for decoding a codeword in NRZ format with a k constraint read from the disk into an output data. According to an example embodiment with reference to FIG. 13, the system 1300 comprises a dedicated servo medium 1302 including a data recording layer 1304 and a servo layer 1305, a spindle motor (not shown) configured to rotate the plurality of the dedicated servo medium, the above-described encoder 1100 for encoding data to be stored on the data recording layer 1304 (through the read/write channel 1308), and a write head 1306 coupled to the encoder 1100 (through the read/write channel 1308) and operable to write the codewords in NRZ format from the encoder 1100 onto the data recording layer 1304. The system 1300 preferably also include a read head (which may be integrated with the write head 1306) operable to read codewords in NRZ format from the data recording layer 1304, and the above-described decoder 1200 for decoding the codewords in NRZ format read from the data recording layer 1304. For example, it will be appreciated that the encoder 1100 and the decoder 1200 may be stored in a memory device/component 1310 of a host computer or controller 1312 and executable by a computer processor 1314.

Some portions of the description are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate.

In addition, the present specification also implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

While examples of the disclosure have been particularly shown and described with reference to specific examples, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:
1. A method of decoding a codeword that satisfies a k constraint into output data, the method comprising:
using a decoder of a hard disk drive system,
converting each bit of the codeword, wherein the codeword satisfies the k constraint and is in Non-Return-to-Zero (NRZ) format, obtaining, from the converted codeword, a plurality of data blocks comprising a first data block and a plurality of remaining data blocks, performing a first analysis on the plurality of data blocks for modifying each of the plurality of data blocks that satisfies a first predetermined criterion, and performing a second analysis on the plurality of data blocks after the first analysis for modifying each of the plurality of data blocks that satisfies a second predetermined criterion to obtain the output data; and providing the output data to a host computer.

2. The method of claim 1, wherein performing the first analysis comprises replacing each of the plurality of data blocks that satisfies the first predetermined criterion, and wherein performing the second analysis comprises replacing each of the plurality of data blocks that satisfies the second predetermined criterion.

3. The method of claim 1, wherein the first predetermined criterion comprises whether a current data block of the plurality of data blocks contains a predetermined set of binary bits, and wherein performing the first analysis comprises replacing each of the plurality of data blocks that satisfies the first predetermined criterion with a predetermined data block.

4. The method of claim 3, wherein the predetermined set of binary bits contains all binary '0' bits and the predetermined data block contains all binary '1' bits.

5. The method of claim 1, wherein the second predetermined criterion comprises whether a most significant bit of the first data block has a predetermined bit.

6. The method of claim 5, wherein the predetermined bit is a binary '1' bit.

7. The method of claim 1, wherein obtaining from the converted codeword comprises obtaining a plurality of single-bit data blocks and the plurality of data blocks comprising the first data block and the plurality of remaining data blocks, and the k constraint is an odd k constraint.

8. The method of claim 7, wherein a quantify of the single-bit data blocks corresponds to a quantity of the data blocks.

9. The method of claim 7, further comprising concatenating the plurality of single-bit data blocks with the plurality of data blocks to obtain the output data after the modifying in the second analysis.

10. The method of claim 1, wherein the codeword further satisfies a dc-free constraint.

11. A decoder for decoding a codeword that satisfies a k constraint into output data, the decoder comprising:

a conversion module to convert each bit of the codeword, wherein the codeword satisfies the k constraint and is in Non-Return-to-Zero (NRZ) format;

an extraction module to obtain, from the converted codeword, a plurality of data blocks comprising a first data block and a plurality of remaining data blocks;

a first analysis module to perform a first analysis on the plurality of data blocks for modifying each of the plurality of data blocks that satisfies a first predetermined criterion; and a second analysis module to perform a second analysis on the plurality of data block after the first analysis for modifying each of the plurality of data blocks that satisfies a second predetermined criterion to obtain the output data.

12. A hard disk drive system comprising:
a dedicated servo medium including a data recording layer and a servo layer;
a spindle motor to rotate the dedicated servo medium;
a read head to read codewords from the data recording layer; and
a decoder of claim 11, wherein the decoder is further to decode the codewords in Non-Return-to-Zero (NRZ) format read from the data recording layer.

13. The decoder of claim 11, wherein, to perform the first analysis, the first analysis module is further to replace each of the plurality of data blocks that satisfies the first predetermined criterion, and wherein, to perform the second analysis, the second analysis module is further to replace each of the plurality of data blocks that satisfies the second predetermined criterion.

14. The decoder of claim 11, wherein the first predetermined criterion comprises whether a current data block of the plurality of data blocks contains a predetermined set of binary bits, and wherein, to perform the first analysis, the first analysis module is further to replace each of the plurality of data blocks that satisfies the first predetermined criterion with a predetermined data block.

15. The decoder of claim 14, wherein the predetermined set of binary bits contains all binary '0' bits and the predetermined data block contains all binary '1' bits.

16. The decoder of claim 11, wherein the second predetermined criterion comprises whether a most significant bit of the first data block has a predetermined bit.

17. The decoder of claim 16, wherein the predetermined bit is a binary '1' bit.

18. The decoder of claim 11, wherein, to obtain from the converted codeword, the extraction module is further to obtain a plurality of single-bit data blocks and the plurality of data blocks comprising the first data block and the plurality of remaining data blocks, and the k constraint is an odd k constraint.

19. The decoder of claim 18, wherein a quantity of the single-bit data blocks corresponds to a quantity of the data blocks.

20. The decoder of claim 18, wherein the second analysis module is further to concatenate the plurality of single-bit data blocks with the plurality of data blocks to obtain the output data after the modifying in the second analysis.

* * * * *